(12) United States Patent
Belzile (10) Patent No.: US 9,296,136 B2
(45) Date of Patent: Mar. 29, 2016

(54) SHOOTING POT CIRCUIT VALVE

(71) Applicant: Husky Injection Molding Systems Ltd., Bolton (CA)

(72) Inventor: Manon Danielle Belzile, Fairfield, VT (US)

(73) Assignee: HUSKY INJECTION MOLDING SYSTEMS LTD, Bolton, Ontario (CA)

( * ) Notice: Subject to any disclaimer, the term of this patent is extended or adjusted under 35 U.S.C. 154(b) by 0 days.

(21) Appl. No.: 14/399,011

(22) PCT Filed: Jun. 13, 2013

(86) PCT No.: PCT/US2013/045546
§ 371 (c)(1),
(2) Date: Nov. 5, 2014

(87) PCT Pub. No.: WO2013/191996
PCT Pub. Date: Dec. 27, 2013

(65) Prior Publication Data
US 2015/0158217 A1    Jun. 11, 2015

Related U.S. Application Data

(60) Provisional application No. 61/662,586, filed on Jun. 21, 2012.

(51) Int. Cl.
| B29C 45/17 | (2006.01) |
| B29C 45/02 | (2006.01) |
| B29C 45/27 | (2006.01) |
| B29C 45/28 | (2006.01) |

(52) U.S. Cl.
CPC ............. *B29C 45/02* (2013.01); *B29C 45/2725* (2013.01); *B29C 45/28* (2013.01)

(58) Field of Classification Search
CPC ...... B29C 45/02; B29C 45/2725; B29C 45/28
See application file for complete search history.

(56) References Cited

U.S. PATENT DOCUMENTS

| 3,146,282 | A | 8/1964 | Ninneman |
| 3,247,304 | A * | 4/1966 | Ninneman ............ B29C 45/461 |
| | | | 264/328.19 |
| 3,390,433 | A * | 7/1968 | Barnett ................. B29C 45/461 |
| | | | 222/149 |
| 4,717,324 | A | 1/1988 | Schad et al. |
| 5,858,420 | A | 1/1999 | Szajak et al. |
| 6,062,840 | A * | 5/2000 | Lee ..................... B29C 45/2725 |
| | | | 264/255 |
| 7,704,433 | B2 | 4/2010 | Sicilia |
| 8,007,272 | B2 | 8/2011 | Jenko et al. |
| 2004/0018266 | A1 | 1/2004 | Clarke |
| 2009/0108500 | A1 | 4/2009 | Jenko |
| 2009/0274790 | A1 | 11/2009 | Jenko et al. |

OTHER PUBLICATIONS

International Search Report, 3 pages, Dec. 2, 2013.

* cited by examiner

*Primary Examiner* — Jill Heitbrink (57) ABSTRACT

An injection molding system including a valve operated shooting pot and methods of use are disclosed. The shooting pot may have an inlet and an outlet and a valve may be control flow through both the inlet and the outlet. The valve may be selectively movable between a first position and a second position. The valve may block flow through the inlet and permit flow through the outlet in the first position, and permit flow through the inlet and block flow through the outlet in the second position.

23 Claims, 10 Drawing Sheets

SHOOTING POT CIRCUIT VALVE

BACKGROUND

Injection molding of plastics is a common technique used for manufacturing items ranging from plastic bottles to medical devices. To facilitate high-volume manufacturing, many injection molding machines incorporate a hot runner having a plurality of separate nozzles for delivering material to a plurality of molding cavities within a mold. In order to control the volume of material delivered to each mold cavity, and the pressure at which the material is injected, injection molding machines sometimes include shooting pots for supplying material to be injected into an individual or several connected molding cavities. In operation, a shooting pot receives a predetermined amount of material from a refill circuit and subsequently injects the material into an injection circuit at a predetermined pressure to fill the connected mold cavities. Oftentimes, the pressure at which a shooting pot receives material from a refill circuit is lower than the pressure at which the shooting pot injects material into the injection circuit which is in fluid communication with a mold.

SUMMARY

The inventors have recognized that due to the differences in pressure between the refill and injection circuits, it is necessary to isolate the refill and injection circuits from each other during injection and refill. Other reasons to isolate the refill from the injection circuits as recognized by the inventors include preventing the melt from escaping from the shooting pot during the refill process and preventing high pressure melt from leaking into the refill circuit during injection, thereby avoiding inaccuracies of the metered shot. The inventors have also recognized that prior arrangements using two separate valves, each separately controlling the inlet and outlet of the shooting pot increases tool complexity and reduces the reliability of the system due to the possibility of multiple components separately failing. In addition, the inventors have recognized that a single valve that acts to allow flow into the shooting pot while simultaneously blocking flow from the shooting pot and that blocks flow into the shooting pot while simultaneously allowing flow from the shooting pot may provide a compact, reliable, and easily actuated valve for controlling a shooting pot.

In one embodiment, an injection molding system includes a shooting pot having an inlet and an outlet and a valve adapted to control flow through both the inlet and the outlet. The valve is selectively movable between a first position and a second position. The valve blocks flow through the inlet and permits flow through the outlet in the first position, and permits flow through the inlet and blocks flow through the outlet in the second position.

In another embodiment, a method is disclosed for selectively allowing material to flow into and out from a shooting pot of an injection molding system. The shooting pot includes an inlet and an outlet with a valve adapted to control flow through both the inlet and the outlet. The method includes: positioning the valve in a first position to block flow through the inlet and permit flow through the outlet; and positioning the valve in a second position to permit flow through the inlet and block flow through the outlet.

In yet another embodiment, an injection molding system includes a hot runner and a shooting pot in fluid communication with the hot runner having an inlet and an outlet. A valve gated nozzle in fluid communication with the outlet includes a valve stem movable between a first and second position. The valve stem permits flow through the valve gated nozzle in the first position and blocks flow through the valve gated nozzle in the second position. The valve stem also includes a portion adapted to block flow through the inlet in the first position, and permit flow through the inlet in the second position.

In another embodiment, an injection molding system includes a first conduit having a first flow direction and a second conduit having a second flow direction. The molding system also includes a valve adapted to control the flow through both the first conduit and second conduit. An axis of the valve is substantially perpendicular to both the first flow direction and the second flow direction.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 3-9B are schematic views of various embodiments of an elongated rod used to direct flow through the shooting pot;

DETAILED DESCRIPTION

The inventors have recognized a need for reliable, less complex, systems and methods for isolating the refill and injection circuits of a shooting pot during an injection molding process. In view of the above, the inventors have recognized the benefits associated with providing a valve arranged to control the flow through both the inlet and the outlet of the shooting pot such that it may isolate the refill and injection circuits from each other during respective the injection and refill cycles of the shooting pot. For example, providing a single valve may result in reduced tool complexity, reduced component size, and simpler actuation mechanisms. In addition, a single valve may incorporate fewer moving components which may reduce leakage paths, tool wear, and melt degradation.

As noted above, the valve may be arranged to control the flow through both the inlet and outlet of the shooting pot. In such an arrangement, the inlet may be in fluid communication with a refill circuit and the outlet may be in fluid communication with an injection circuit. Furthermore, the valve may be configured such that it selectively blocks the inlet and permits flow through the outlet in a first position and selectively blocks the outlet and permits flow through the inlet in a second position. Thus, by selectively positioning the valve, flow into and out of the shooting pot may be controlled by a single valve selectively controlling the flow through both the inlet and outlet of the shooting pot. Furthermore, by controlling the flow into and out of the shooting pot, the valve may be used to place the shooting pot into selective fluid communication with either the refill circuit or the injection circuit, depending on whether it is a refill or injection portion of the injection molding cycle. Such an arrangement may be useful with any injection molding system including for example, injection molding systems incorporating valve gated nozzles and/or hot tip nozzles.

As described in more detail below, the valve may be configured in any number of ways to selectively isolate a shooting pot from the operatively coupled refill and injection circuits when placed in the first and second positions. For example, the valve may be a member, such as an elongated rod, that includes first and second portions adapted to selectively block the inlet and outlet of a shooting pot to facilitate the desired selective isolation of the associated refill and injection circuits. Furthermore, the first and second portions may be shaped and configured in any number of ways to selectively block and allow flow through the inlet and outlet of the shooting pot. For example, in one embodiment, through holes could be used for either portion such that the valve may be rotated to selectively align the through holes with corresponding conduits and permit flow therethrough. In another embodiment, the first and second portions may include reduced cross-sectional areas. When flow through a conduit is desired, a reduced cross-sectional area may be brought into alignment with a corresponding conduit to permit flow therethrough and around the reduced cross-sectional area. In yet another embodiment, either of the first and second portions may be solid portions sized and shaped to occlude a conduit when positioned therein. In such a configuration, the solid portion may be selectively inserted into and removed from a conduit to selectively permit flow therethrough. In each of the above embodiments, the member, and its corresponding first and second portions, may be moved between the first and second positions to selectively block and allow flow through the inlet and outlet of a shooting pot using a rotational motion, a linear motion, or any appropriate combination thereof. Furthermore, while specific methods for selectively blocking a flow through a corresponding conduit have been disclosed, the current disclosure should not be limited in this manner as any number of configurations to selectively permit flow through a valve and corresponding conduit would be apparent to one of ordinary skill in the art.

In certain embodiments, a molding system may include a first conduit in fluid communication with an inlet of the shooting pot and a second conduit in fluid communication with an outlet of the shooting pot. The first conduit has a first flow direction corresponding to the direction of material flow therethrough. Similarly, the second conduit has a second flow direction corresponding to the direction of material flow therethrough. The conduits may be arranged in any appropriate configuration relative to each other. For example, the first flow direction may be parallel, perpendicular, or even oriented at an angle to the second flow direction. In addition, in some embodiments the first and second flow directions are aligned with one another such that an axis of the first conduit is substantially aligned with an axis of the second conduit. Alternatively, the first and second flow directions may be unaligned such that they lie in separate planes. In addition, the conduits could be oriented relative to one another such that a third axis, corresponding to the valve axis, intersects both conduits. To provide control over the flows through the separate conduits, the above noted valve controls the flow through both the first and second conduit. Furthermore, in some embodiments, the valve is constructed and arranged such that an axis of the valve is substantially perpendicular to both the first flow direction and the second flow direction. In some instances, the axis may preferably be a longitudinal axis of the valve.

Figure 1A:
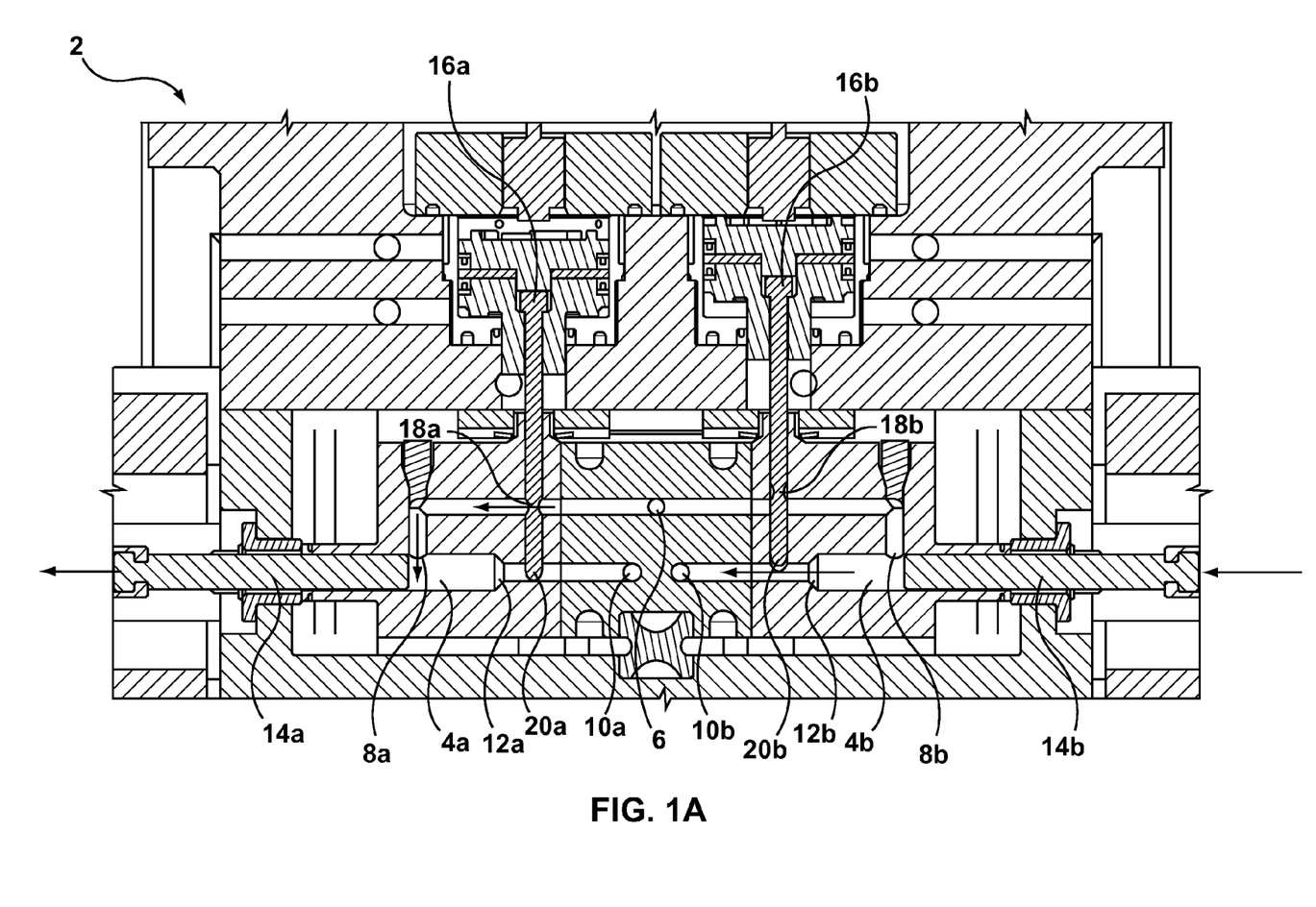
FIG. 1A is a schematic cross-sectional view of a hot runner system including shooting pot circuit valves.

Turning now to the figures, FIG. 1A depicts one embodiment of a hot runner system 2 which includes shooting pots 4a and 4b, though any number of shooting pots could be used. The shooting pots are fluidly connected to a refill circuit 6 of the hot runner system via inlets 8a and 8b. Shooting pots 4a and 4b are connected to separate injection circuits 10a and 10b via outlets 12a and 12b. The injection circuits are operatively coupled with any appropriate hot runner nozzle, not depicted in FIG. 1, for delivering material to a mold cavity. The shooting pots are pressurized using plungers 14a and 14b to provide pressurized melt to the hot runner nozzle. The plungers 14a and 14b are subsequently withdrawn to permit material to flow from the pressurized refill circuits 6 into the shooting pots for the next injection cycle. In the depicted embodiment, each shooting pot has a valve (16a, 16b) that selectively blocks the inlet and the outlet of the corresponding shooting pot. Each valve is moved between a first position in which the injection circuit is in fluid communication with the shooting pot and a second position in which the refill circuit is in fluid communication with the shooting pot.

Valves 16a and 16b, as depicted in FIG. 1A, correspond to elongated members or valve stems that interact with both the inlet and outlet of the corresponding shooting pots. The elongated members include separate first and second portions that respectively interact with the inlet and outlet such that the elongated member, when selectively moved between a first and second position, blocks flow through the inlet or through the outlet of the shooting pot. The elongated member selectively blocks flow through both the inlet and outlet of the shooting pot by selectively aligning the first portions, 18a and 18b, with the corresponding inlets and the second portions, 20a and 20b, with the corresponding outlets. As depicted in FIG. 1A, the first portions 18a and 18b each include a region of reduced cross section permitting material to flow past when it is aligned with the conduit fluidly connecting the refill circuit and inlet. The second portions 20a and 20b each includes a solid distal end that is shaped and sized to occlude the flow of material from the outlet when positioned within the conduit fluidly connecting the injection circuit and outlet.

Turning now to the operation of the hot runner system, valve 16a depicted in FIG. 1A corresponds to a valve being arranged in a position to permit flow from inlet circuit 6 through inlet 8a and into shooting pot 4a. In this position, the valve substantially prevents flow through outlet 12a, since the distal end of the valve is blocking the conduit fluidly connecting the outlet 12a and injection circuit 10a. Thus, when plunger 14a is retracted outwards from the shooting pot 4a, material can flow from the pressurized refill circuit 6 into shooting pot 4a. Similarly, valve 16b corresponds to a valve being arranged in a position to permit flow from the shooting pot 4b through outlet 12b and into injection circuit 10b. Here the first portion is no longer aligned with the conduit fluidly connecting inlet 8b and refill circuit 6. Thus, flow from the refill circuit to the shooting pot is blocked. In addition, the second portion 20b corresponding to the distal end of the valve no longer occludes the conduit fluidly connecting outlet 12b to injection circuit 10b in this position. Thus, the shooting pot and injection circuit are in fluid communication with one another. Correspondingly, when plunger 14b is displaced inwards into the shooting pot 4b, material is injected from the shooting pot 4b through the outlet 12b and injection circuit 10b and into a mold via a hot runner nozzle (the mold and nozzle are not depicted).

Figure 1B:
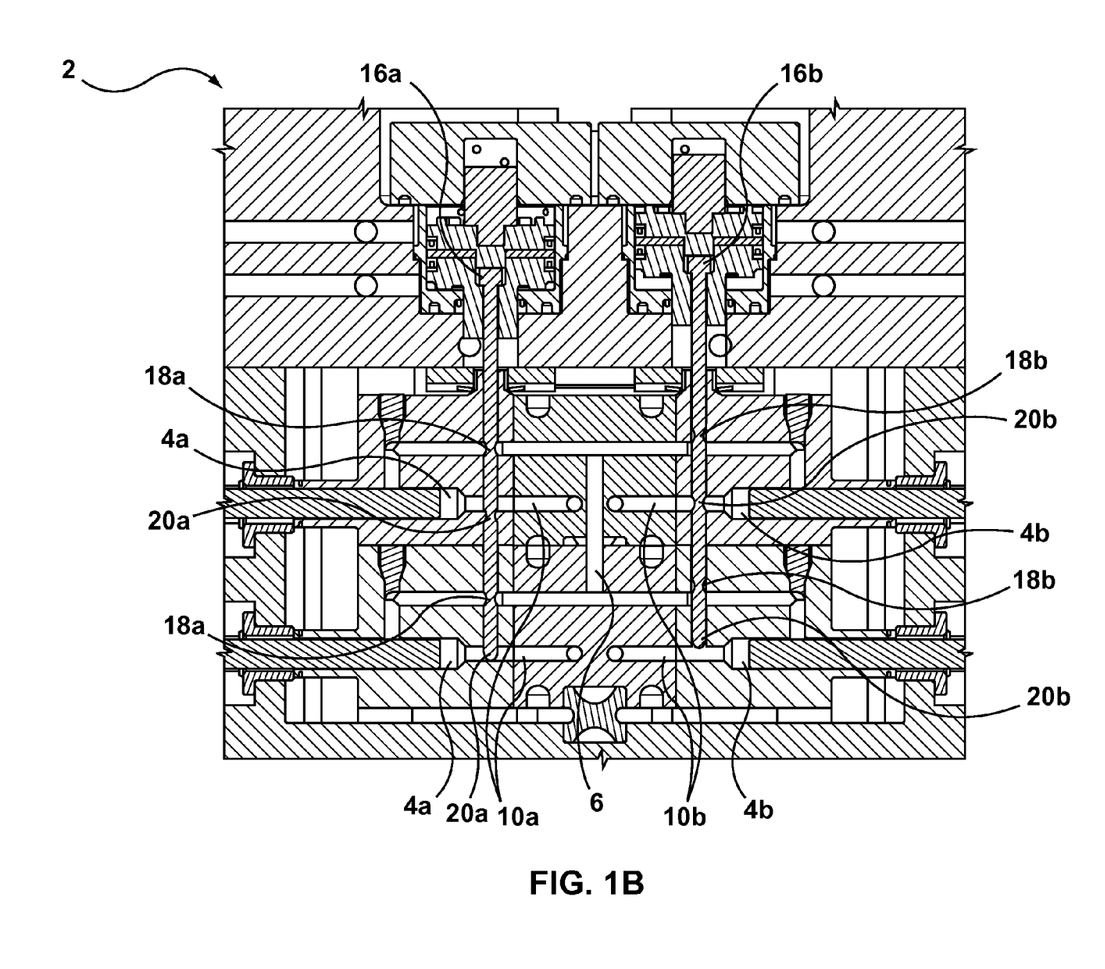
FIG. 1B is a schematic cross-sectional view of a hot runner system including shooting pot circuit valves that control a plurality of shooting pots.

FIG. 1B depicts another embodiment of a hot runner system 2, which includes a plurality of shooting pots 4a and 4b, shown in the embodiment as being aligned, though the shooting pots need not necessarily be aligned. Similar to the system depicted in FIG. 1A, the shooting pots are fluidly connected to a refill circuit 6 of the hot runner system. Shooting pots 4a and 4b are also connected to separate injection circuits 10a and 10b. In the depicted embodiment, the hot runner system includes valves 16a and 16b, with each valve selectively blocking the inlet and outlet of a plurality of corresponding shooting pots. The valves are moved between a first position in which the injection circuits are in fluid communication with their associated shooting pots and a second position in which the refill circuit is in fluid communication with the associated plurality of shooting pots.

Similar to the embodiment depicted in FIG. 1A, valves 16a and 16b, as depicted in FIG. 1B, correspond to elongated members or valve stems. However, in the current embodiment, the elongated members simultaneously interact with the inlet and outlet of a plurality of stacked shooting pots. Specifically the elongated members include multiple first portions 18a and 18b that interact with the inlets of the associated shooting pots and multiple second portions 20a and 20b that interact with the outlets of the associated shooting pots. As above, the first portions 18a and 18b and second portions 20a and 20b correspond to regions of reduced cross sectional area and/or solid portions shaped and sized to occlude the flow of material through an associated conduit.

Turning now to the operation of the hot runner system depicted in FIG. 1B, valve 16a corresponds to a valve being arranged in a position to permit flow from inlet circuit 6 into both shooting pots 4a. In this position, valve 16a substantially prevents flow through injection circuits 10a since solid portions of the valve substantially block the conduits fluidly connecting the shooting pots 4a and the injection circuits 10a. Similarly, valve 16b corresponds to a valve being arranged in a position to permit flow from both shooting pots 4b through injection circuits 10b. Here, the first portions of the valve are no longer aligned with the conduits fluidly connecting the shooting pot assemblies 4b and refill circuit 6. Thus, flow from the refill circuit to the shooting pots is blocked. In addition, in this position the second portions 20b no longer occlude the conduits fluidly connecting shooting pots 4b to the separate associated injection circuits 10b. Therefore, each shooting pot is in fluid communication with its associated injection circuit. Thus, in this embodiment, a single valve is able to control the flow into and out of a plurality of associated shooting pots.

Having described the overall function of the currently disclosed valve to selectively isolate the refill and injection circuits from one another for one, or a plurality of, shooting pots, several exemplary types of valve configurations and their incorporation into various shooting pots will now be described. While specific arrangements, and flow control mechanisms are described, the current disclosure is not limited to the depicted embodiments since any number of variations would be obvious to one of ordinary skill in the art. Instead, the disclosure should be viewed generally as disclosing any valve with two portions that are adapted and arranged to selectively block the inlet and outlet of a shooting pot. Consequently, the valve may be of any appropriate shape including, for example, circular rods, non-circular rods, blocks, plates, nonlinear shapes, or any other suitable shape. The valve may also be any desired length or proportion such that it may interact with both the inlet and outlet of a shooting pot. In addition, as described in more detail below, the separate portions of the elongated member may be configured in any number of ways to selectively permit or block flow including, for example, through holes, reduced cross-sectional areas, cutouts, solid portions sized and shaped to occlude a conduit, or any other appropriate geometry. Furthermore, the valve may be actuated using any desired motion including, for example, linear motion, rotational motion, or any suitable combination thereof and may be actuated by any suitable motive force such as electric, hydraulic, pneumatic or any combination thereof.

Figure 2:
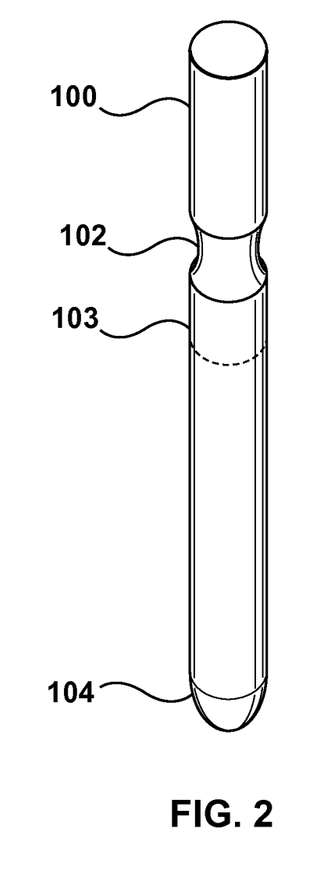
FIG. 2 is a schematic perspective view of an elongated rod for use with the shooting pot circuit valve, including a portion with a reduced cross-sectional area.

FIG. 2 depicts one embodiment of a member corresponding to an elongated rod 100. The elongated rod includes a first portion 102 with a reduced cross-sectional area. The reduced cross-sectional area 102 is aligned with a conduit (not shown) to permit material to pass therearound. The adjacent portion of the elongated rod has a cross-sectional area 103 sized to substantially block flow through the conduit when the first portion is not aligned with that conduit. The elongated rod 100 may also include a second portion 104 corresponding to a solid distal end of the rod. Though the end 104 is depicted as having a rounded end, other shapes, such as a cylindrical shape, may be used. The solid distal end is shaped such that it may be disposed within the conduit to substantially occlude flow therethrough. The different portions are appropriately spaced from one another such that when it is desired to permit flow through one conduit and block flow through the other, the elongated rod may be linearly displaced along its longitudinal axis to selectively permit or block a flow. Therefore, flows may be selectively blocked or permitted through both conduits using a single valve.

Figure 3:
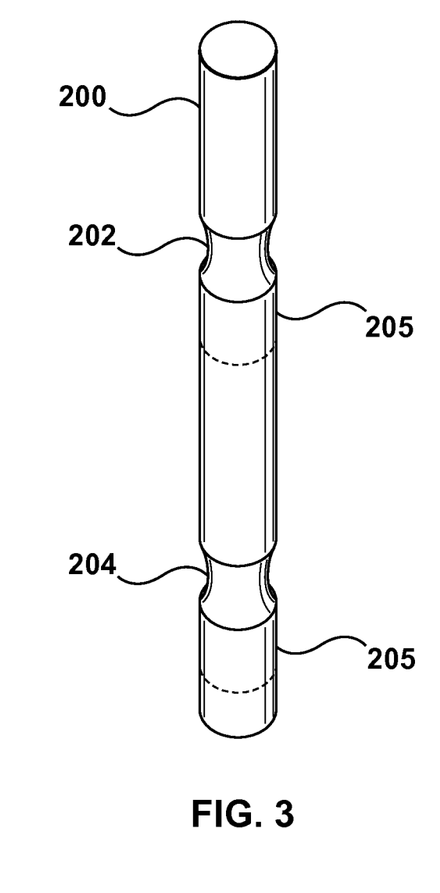

In another embodiment, as depicted in FIG. 3, an elongated rod 200 includes first and second portions 202 and 204 with reduced cross-sectional areas. The reduced cross-sectional area of portion 204 is used to allow flow therepast, whereas the adjacent solid section 205 is used to block a flow. However, both arrangements may be used in substantially similar ways as will be described in more detail below. While the adjacent solid sections have been depicted as being located below the reduced cross-sectional areas, the adjacent solid sections may be located on either side of the reduced cross-sectional areas depending on the actuation direction of the valve.

Figure 4:
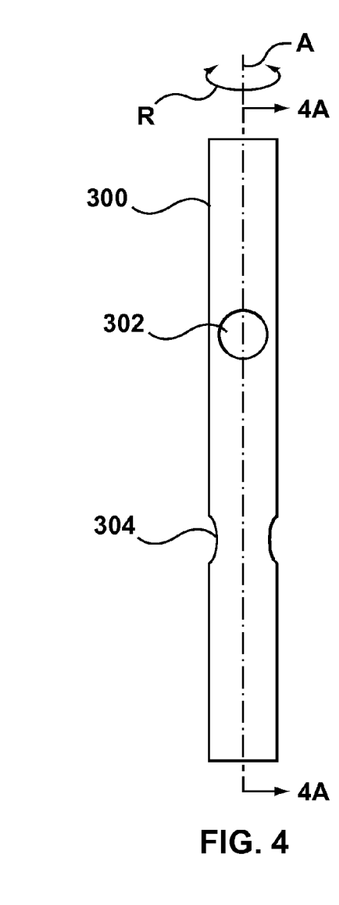
Figure 4A:
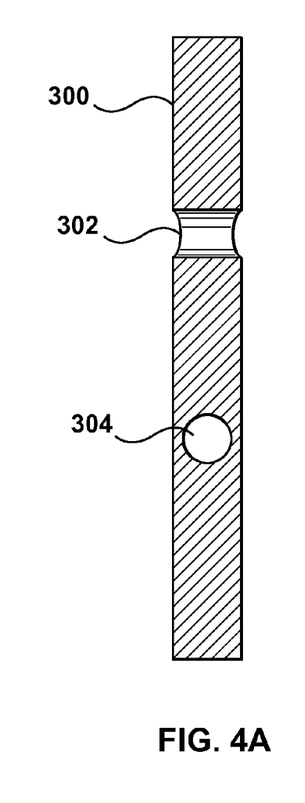
Figure 5:
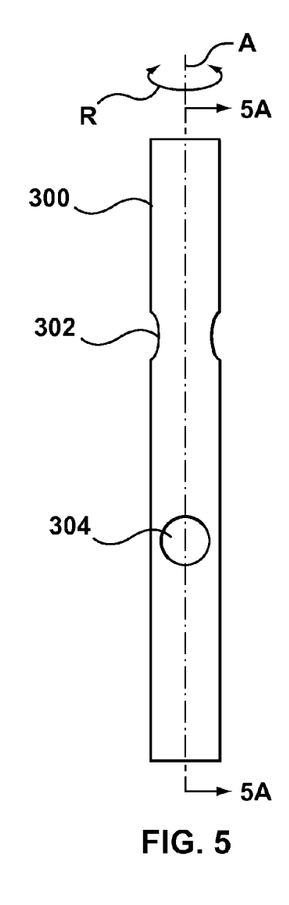
Figure 5A:
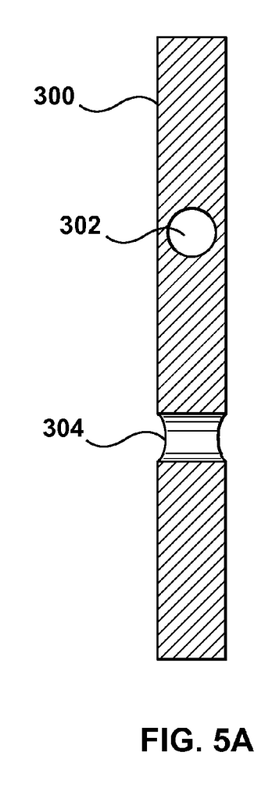

FIGS. 4-5A depict another embodiment of a member corresponding to an elongated rod 300, each in two orientations rotated 90° from each other. The elongated rod 300 has first and second portions 302 and 304 corresponding to through holes. In such an embodiment, the first and second portions are aligned with separate conduits. If the conduits flow substantially parallel to one another, the through holes may be arranged substantially orthogonal to one another as depicted in the figures, though other arrangements are also contemplated. When it is desired to permit flow through one conduit and block flow through the other, the elongated rod 300 is rotated about the longitudinal axis A as shown via arrow R approximately 90° to selectively move one through hole out of alignment with a corresponding first conduit (e.g., first portion 302) and place the other through hole (e.g., second portion 304) substantially into alignment with a corresponding second conduit. Therefore, flows may be selectively blocked or permitted through both conduits using a single valve. While orthogonally arranged through holes have been depicted, other relative orientations are possible for different relative arrangements of the conduits.

Figure 6:
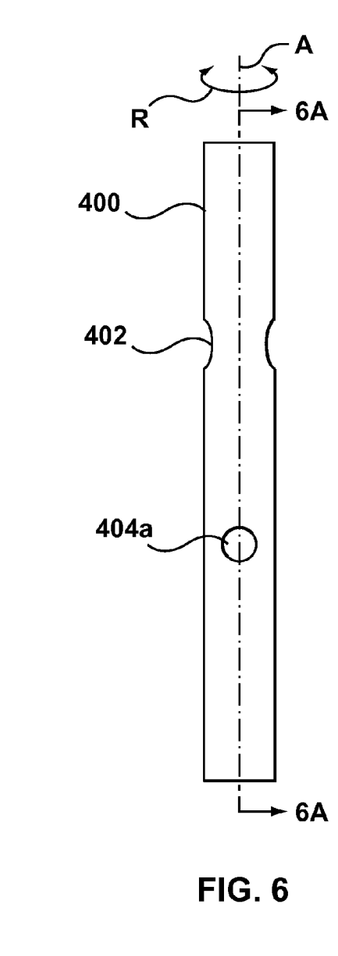
Figure 6A:
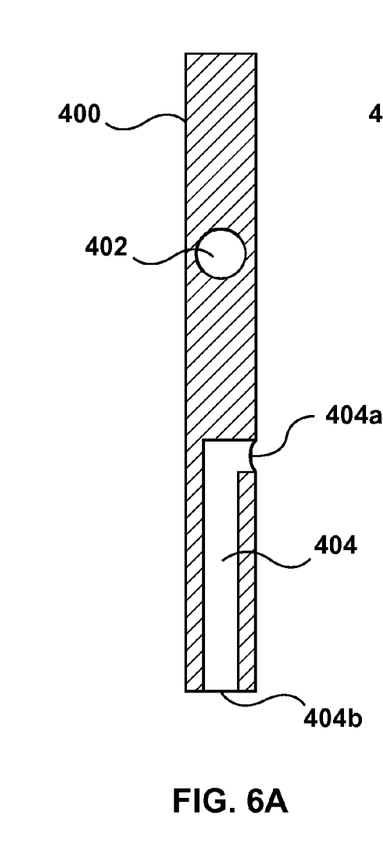
Figure 7:
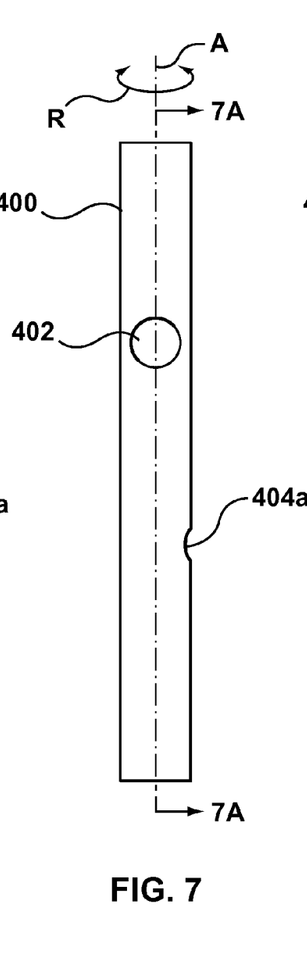
Figure 7A:
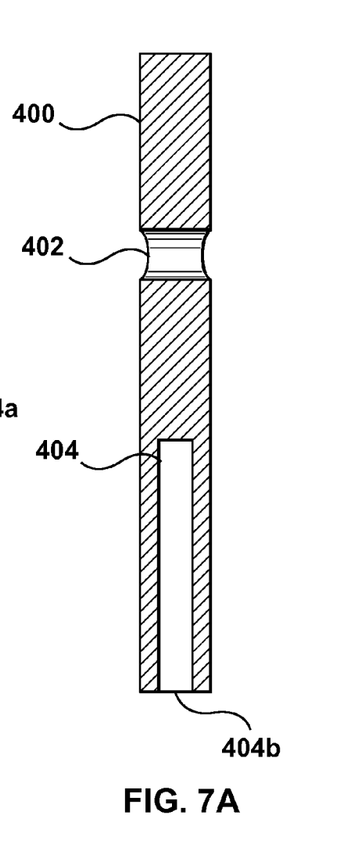

FIGS. 6-7A show an embodiment of a member corresponding to an elongated rod 400, each in two orientations rotated 90° from each other. The depicted embodiment is similar to that described above in regards to FIGS. 4-5A in that it has a first portion corresponding to a through hole 402. However, rod 400 also includes a second portion corresponding to an internal conduit 404. The internal conduit 404 extends between a hole 404a located on a side of the elongated rod to the distal end 404b of the elongated rod. As depicted in the figure, the through hole 402 and internal conduit 404 are arranged substantially orthogonal to one another. Therefore, similar to the above, the elongated rod may be rotated about the longitudinal axis A as shown via arrow R approximately 90° to selectively move the first and second portions of the elongated rod into and out of alignment with corresponding first and second conduits. In some embodiments, the elongated member may be adapted to provide flow conditioning. For example, the elongated member could: function as a thermal heat pipe, to provide heat to the melt flowing therethrough; provide mixing using structures such as mixing pins and/or helical vanes within the internal conduit; and/or provide any other desired flow conditioning as would be apparent to one of ordinary skill in the art. T The depicted embodiment could also function as an alignment device to ensure alignment of various components within the injection molding system. The above embodiment could be of use in systems with space constraints and/or other considerations as would be apparent to one of ordinary skill in the art. While only one internal conduit has been depicted, it should be appreciated that the elongated rod could include one or more internal conduits in either the first and/or second portion. Furthermore, relative orientations of the two portions, other than orthogonal, are also contemplated. The operation of this embodiment will be described more fully below with respect to FIGS. 11A and 11B.

Figure 8A:
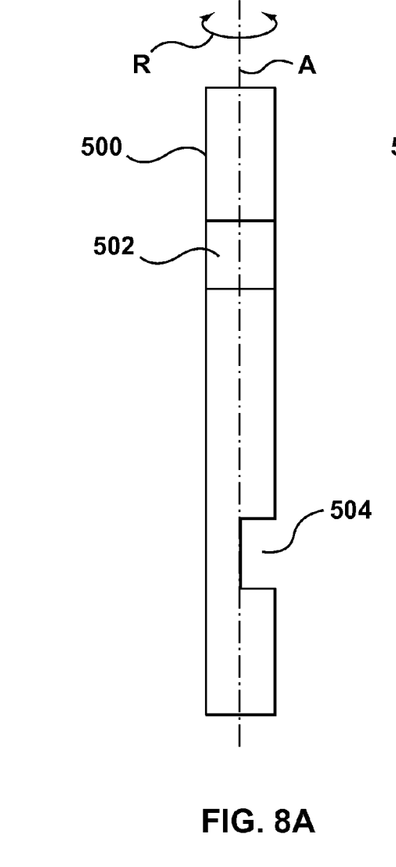
Figure 8B:
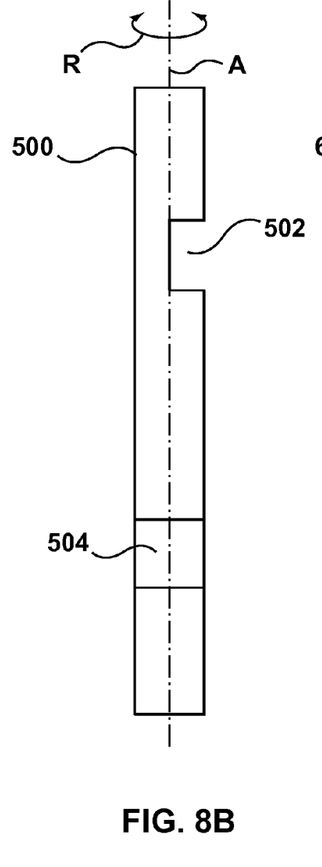
Figure 9A:
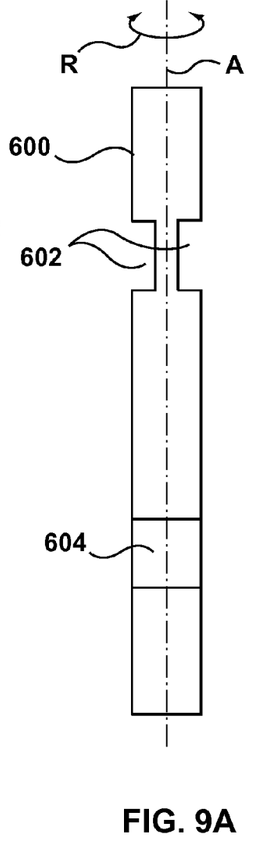
Figure 9B:
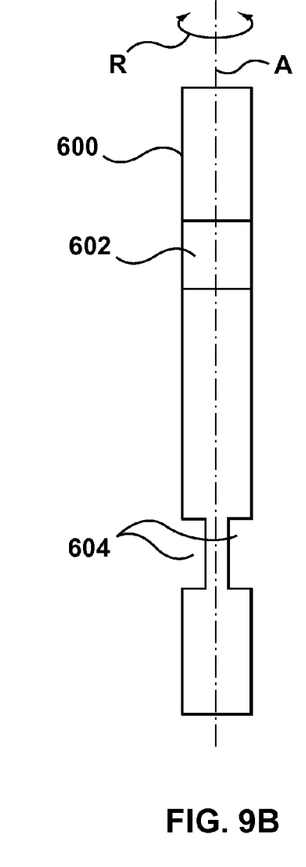

FIGS. 8A-8B depict yet another embodiment of a member corresponding to an elongated rod 500 in two orientations rotated 90° from each other. The elongated rod 500 includes first and second portions 502 and 504 that include cut out regions arranged and configured to control the flow through separate conduits located along the length of the elongated rod. If the separate conduits are substantially parallel to one another, for example, the cut out regions may be arranged substantially orthogonal to one another to alternately block one of the conduits and permit flow through the other as depicted in the figures, though other arrangements are also contemplated. In the embodiment shown in FIGS. 8A-8B, the cut out regions are only located on one side of the elongated rod central axis. However, in another embodiment, as depicted in FIGS. 9A and 9B, an elongated rod 600 may include cut out regions 602 and 604 located on both sides of the elongated rod central axis. However, regardless of the specific embodiment, the regions selectively block or permit the flow of fluid through the conduits by rotating the individual portions into or out of alignment with the conduits. For example, during operation, the first and second portions interact with the corresponding conduits such that in a first orientation the cut out(s) are oriented in a direction substantially perpendicular to the direction of flow through the conduit. Furthermore, the cross section of the rod may be such that it substantially occludes the flow through the conduit when in this orientation. When desired, the rod is rotated about the longitudinal axis A as shown via arrow R approximately 90° to align the cut out(s) in a direction substantially parallel to the direction of flow through the corresponding conduit. In this orientation, material flows through the cut out portion and the corresponding conduit.

Regardless of the specific embodiment chosen, the valve may be integrated into various shooting pots in a number of different ways and may be used for hot tip nozzles, valve gated nozzles, and any other applicable arrangement as would be apparent to one of ordinary skill in the art. Several embodiments of possible ways in which to integrate the valves into a shooting pot assembly are described in more detail below.

Figure 10A:
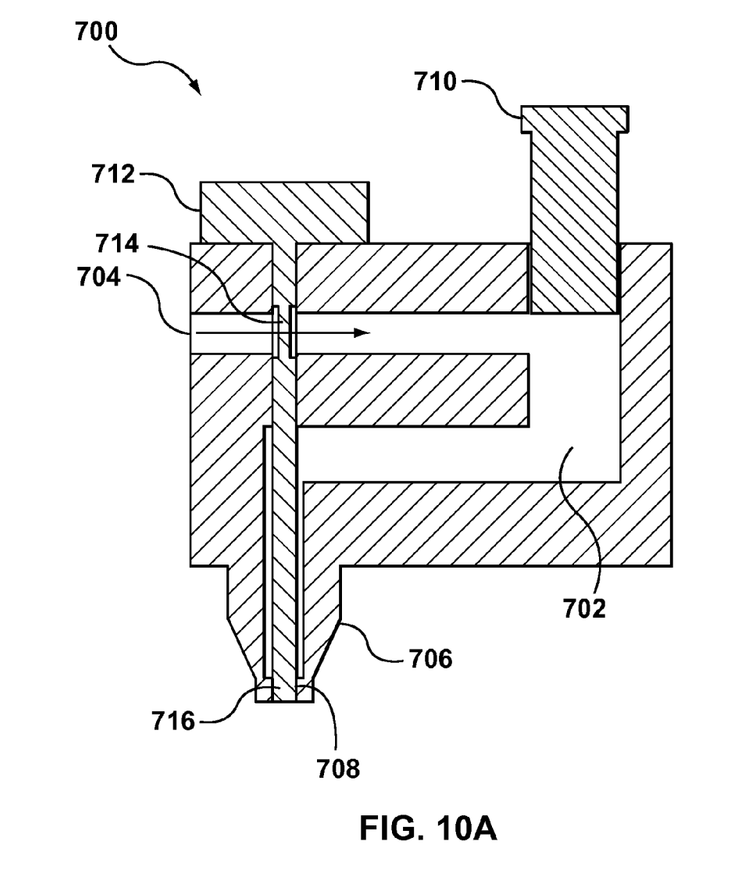
FIG. 10A is a schematic cross-sectional view of a shooting pot during refill and a valve gated nozzle including a linearly actuated valve stem with a portion that selectively allows flow into an inlet to the shooting pot.
Figure 10B:
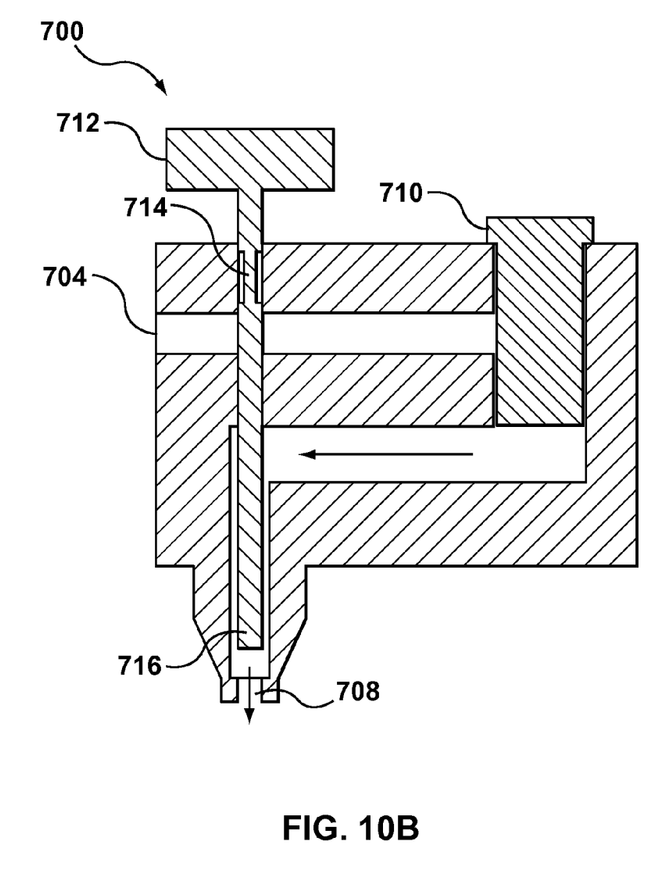
FIG. 10B is a schematic cross-sectional view of a shooting pot during injection and a valve gated nozzle including a linearly actuated valve stem with a portion that selectively blocks an inlet to the shooting pot.

In one embodiment, as depicted in FIGS. 10A-10B, an injection molding system 700 includes a shooting pot 702 with an inlet 704 in fluid communication with a refill circuit. The shooting pot 702 may also be in fluid communication with a nozzle outlet 708 of a valve gated nozzle 706 in fluid communication with an injection circuit and mold cavity. The shooting pot 702 includes a plunger 710, and a linearly actuated valve 712. In the depicted embodiment the valve 712 is integrated with the valve stem of the valve gated nozzle and includes a first portion 714 corresponding to a reduced cross-sectional area and a second portion 716 corresponding to a solid distal end of the valve stem. The valve 712 is displaceable along its longitudinal axis to move between a first and second position to selectively allow or block flow through the inlet 704 and the nozzle outlet 708 in fluid communication with the shooting pot. As depicted in FIG. 10A, when the valve is located in the first position, the first portion 714 having a reduced cross-sectional area is aligned with the inlet 704 and material is permitted to flow past the valve and into shooting pot 702. Furthermore, while in this position, the second portion corresponding to the distal end of the valve stem is aligned with the nozzle outlet 708. The distal end of the valve stem may be sized and shaped to substantially occlude flow through the nozzle outlet 708 when positioned therein. Thus, the shooting pot is refilled with material from a refilling circuit while isolating the shooting pot from an injection circuit and/or mold cavity. When the valve is displaced vertically along its longitudinal axis to the second position, as depicted in FIG. 10B, the first portion 714 is taken out of alignment with inlet 704 and the second portion 716 is removed from the nozzle outlet 708, opening the valve-gated nozzle. Since the reduced cross-sectional area corresponding to the first portion 714 is no longer aligned with the inlet 704, the flow therethrough is substantially blocked by valve 712. Furthermore, the second portion 716 no longer prevents flow from shooting pot 702 through nozzle outlet 708. Consequently, material is injected under pressure into an injection circuit in fluid communication with nozzle outlet 708 while material is substantially prevented from flowing back into the refill circuit in fluid communication with inlet 704.

Figure 11A:
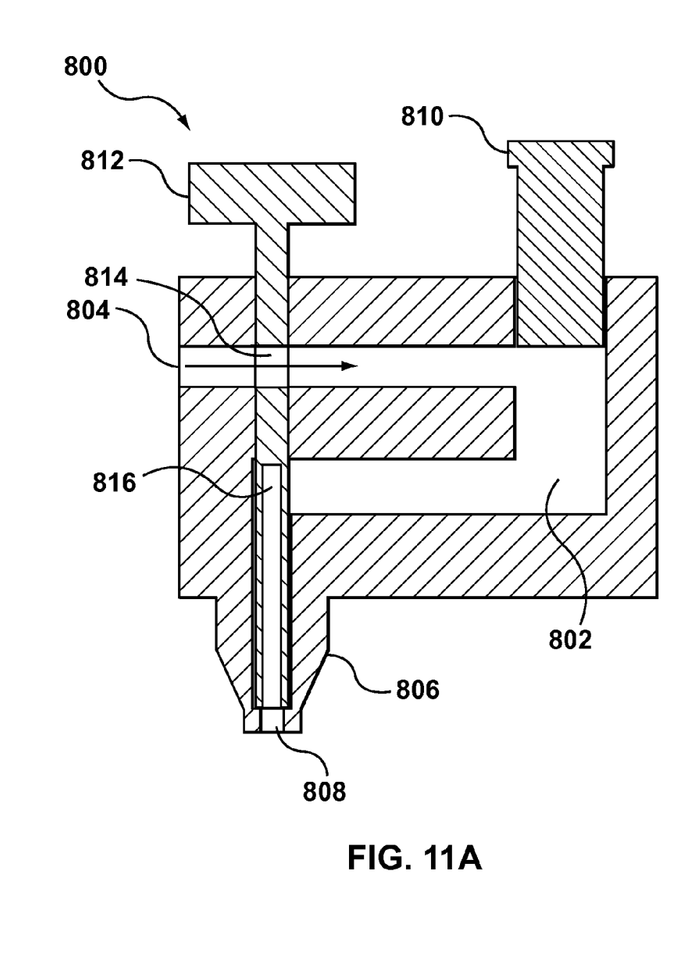
FIG. 11A is a schematic cross-sectional view of a shooting pot during refill and a nozzle assembly including a rotationally actuated flow conditioning valve.
Figure 11B:
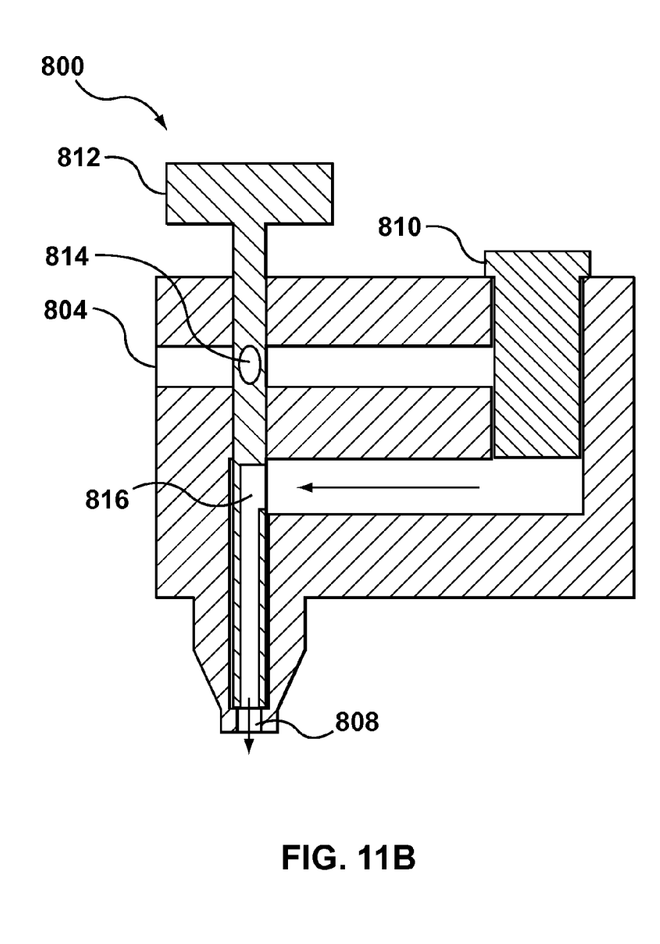
FIG. 11B is a schematic cross-sectional view of a shooting pot during injection and a nozzle assembly including a rotationally actuated flow conditioning valve.

In another embodiment, as depicted in FIGS. 11A-11B, an injection molding system 800 includes a shooting pot 802 with an inlet 804 in fluid communication with a refill circuit. Furthermore, the shooting pot 802 is in fluid communication with, a nozzle outlet 808 of a nozzle 806 in fluid communication with an injection circuit and/or mold cavity. The shooting pot 802 includes a plunger 810 and a rotationally actuated flow conditioning valve 812. Flow conditioning valve 812 may be rotated about its longitudinal axis to move between a first and second position to selectively allow or block flow through inlet 804. Flow through nozzle outlet 808 may be controlled by other arrangements, such as the use of a hot tip nozzle. In the depicted embodiment flow conditioning valve 812 includes a first portion 814 having a through hole and a second portion 816 with an internal conduit in fluid communication with nozzle outlet 808. As depicted in FIG. 11A, when the valve is located in the first position, the first portion 814 having a through hole is aligned with the inlet 804 and material is permitted to flow past the valve and into shooting pot 802. Furthermore, while in this position, the second portion corresponding to the internal conduit 816 is not aligned with the shooting pot isolating the nozzle from the shooting pot. In addition, while in this position, flow from the internal conduit through the nozzle outlet 808 may be controlled by any suitable arrangement. Thus, the shooting pot is refilled with material from a refilling circuit while the shooting pot is isolated from an injection circuit and/or mold cavity. When the flow conditioning valve is rotated about its longitudinal axis to the second position, as depicted in FIG. 10B, the through hole in first portion 814 is taken out of alignment with inlet 804 and the second portion 816 containing the internal conduit places the shooting pot 802 and nozzle outlet 808 of the nozzle 806 in fluid communication with one another. Since the through hole corresponding to the first portion is no longer aligned with the inlet 804, the flow therethrough is substantially blocked by valve 812. Thus, in the second position, material is injected under pressure into an injection circuit and/or mold while material is substantially prevented from flowing back through inlet 804 into the refill circuit. As noted above, with regards to FIGS. 6-7A the internal conduit may provide flow conditioning for material flowing therethrough.

Figure 12A:
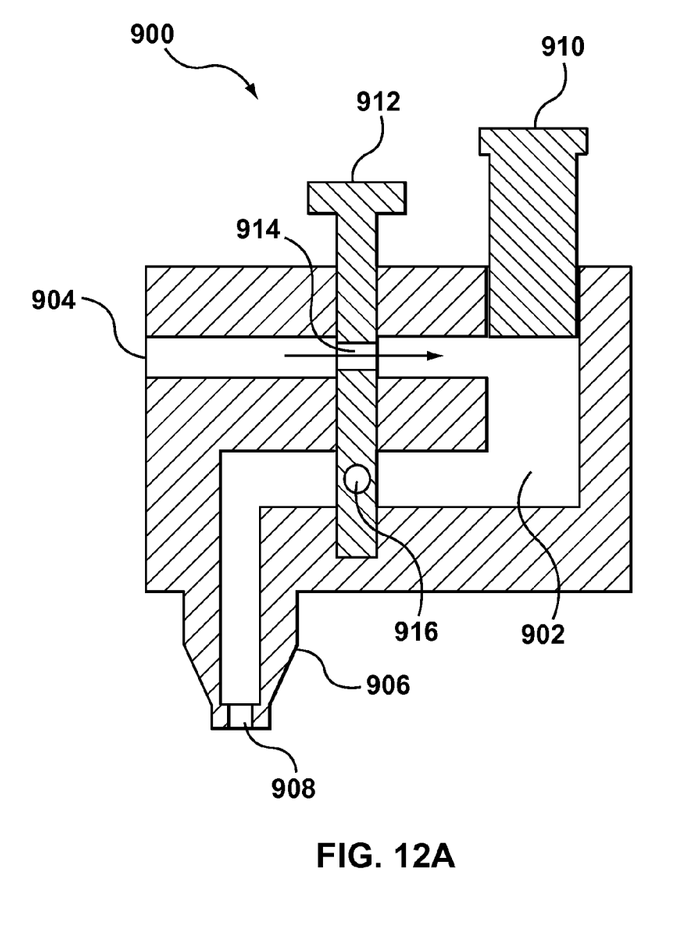
FIG. 12A is a schematic cross-sectional view of a shooting pot during refill with a rotationally actuated valve with a portion that selectively allows flow into both an inlet and outlet of the shooting pot.
Figure 12B:
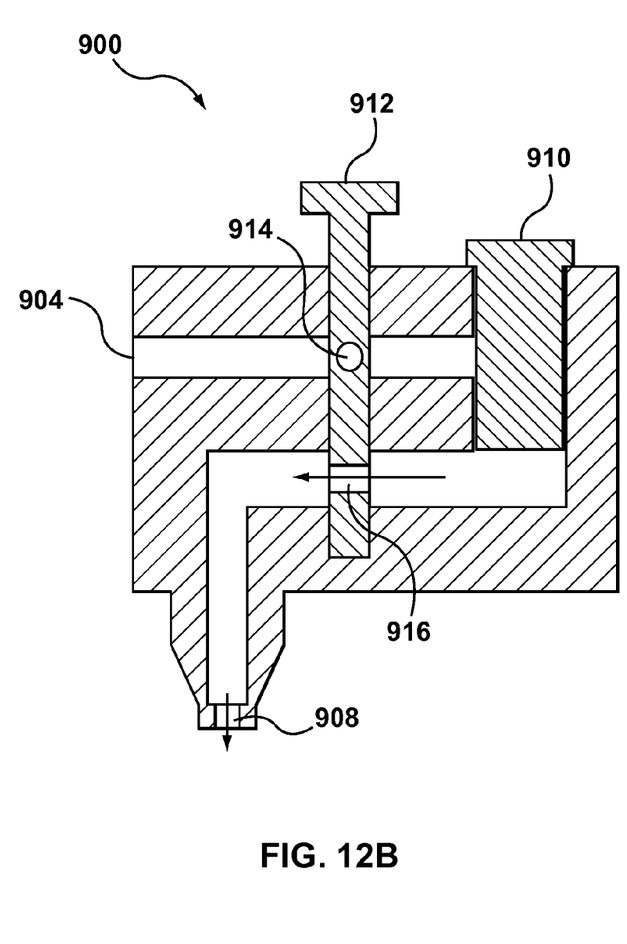
FIG. 12B is a schematic cross-sectional view of a shooting pot during injection with a rotationally actuated valve with a portion that selectively blocks both an inlet and outlet of the shooting pot.
Figure 12C:
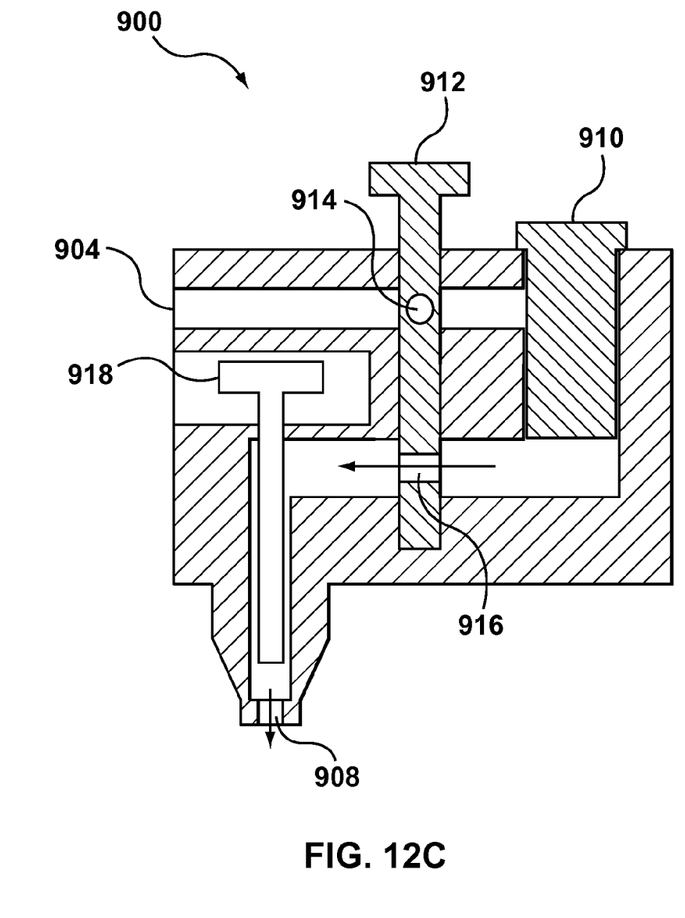
FIG. 12C is a schematic cross-sectional view of a shooting pot during injection with a rotationally actuated flow conditioning valve as well as a separate valve stem.

Instead of incorporating the shooting pot valve with a valve stem of a valve gated nozzle, or a similar structure, the currently disclosed shooting pot arrangement may be used with a hot tip nozzle, a valve gated nozzle with a valve stem separate from the shooting pot valve, or any other appropriate nozzle configuration. In such an embodiment, the valve may be removed from the nozzle, that is, the valve of the shooting pot may be separate from any valve stem, or similar structure, associated with the nozzle, since other mechanisms, such as a hot tip nozzle, may be used to prevent leakage of material from the nozzle when not under pressure. One embodiment of an injection molding system 900 including such an arrangement is presented in FIGS. 12A-12B. In the depicted embodiment, a shooting pot 902 includes an inlet 904 in fluid communication with a refill circuit. The shooting pot 902 is in fluid communication with a nozzle outlet 908 of a hot tip nozzle 906 and with an injection circuit and/or mold cavity. The shooting pot includes a plunger 910, and a rotationally actuated valve 912. The rotationally actuated valve 912 includes through holes 914 and 916. The depicted valve operates in a manner similar to that described above with regards to FIGS. 11A-11B. More specifically, the through holes are oriented relative to one another such that the inlet 904 is in fluid communication with the shooting pot 902 and nozzle outlet 908 is blocked when valve 912 is in a first position as shown in FIG. 12A. Thus, when the valve is located in the first position, material is permitted to flow past the valve and into shooting pot 902. When valve 912 is rotated to a second position, as depicted in FIG. 12B, inlet 904 is blocked and nozzle outlet 908 is placed in fluid communication with the shooting pot. In this position material is injected from the shooting pot into the mold cavity. While a rotational valve has been depicted in this embodiment, valves actuated using linear and non-linear activation, as disclosed above, are also contemplated. In addition, as depicted in FIG. 12C, an injection molding system 900 may include a rotational flow conditioning valve 912 that controls the inlet the shooting pot 902 and may provide flow conditioning of the flow of material provided to the outlet of the shooting pot 902. Similar to the above, flow conditioning may include functioning as a thermal heat pipe, mixing the material, and/or any other desired flow conditioning as would be apparent to one of ordinary skill in the art. A separate linearly actuated valve stem 918 controls flow through the nozzle outlet 908. While FIG. 12C shows a rotational valve, a linearly actuated valve such as those described above with respect to FIGS. 2, 3, 8A, 8B, 9A, and 9B may also be used.

While specific combinations of the currently disclosed valves with shooting pots and various nozzle types have been described above, the current disclosure is not limited to the specific valves and combinations described herein. Instead, as would be understood by one of ordinary skill in the art, the currently disclosed valves may be configured for use with any shooting pot, refill circuit, injection circuit, and/or nozzle employed with any particular hot runner system of an injection molding machine. Furthermore, in addition to the specific locations of the valve depicted in the described embodiments, the valve may be positioned in any number of locations such that it is still capable of selectively blocking flow through both the inlet and outlet of a shooting pot. This may include, for example, the valve being integrated with a shooting pot, being positioned substantially adjacent to a shooting pot, and being adapted and configured to control the conduits in fluid communication with both the inlet and outlet of the shooting pot.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:
1. An injection molding system, comprising:
a plurality of shooting pots each having a shooting pot inlet connected to a refill circuit and a shooting pot outlet connected to an injection circuit in fluid communication with a nozzle outlet; and
a valve adapted to control flow through both the shooting pot inlets and the shooting pot outlets, wherein the valve is selectively movable between a first position and a second position, and wherein the valve blocks flow through the shooting pot inlets and permits flow through the shooting pot outlets in the first position, and permits flow through the shooting mot inlets and blocks flow through the shooting pot outlets in the second position.
2. The molding system of claim 1, wherein the valve comprises a member having first portions adapted to control the flow through the shooting pot inlets and second portions adapted to control the flow through the shooting pot outlets, wherein the member is selectively movable between the first position and the second position.

3. The molding system of claim 2, wherein the member is a unitary member.

4. The molding system of claim 2, wherein the first portions block flow through the shooting pot inlets in the first position and permits flow through the shooting pot inlets in the second position, and wherein the second portions permit flow through the shooting pot outlets in the first position and blocks flow through the shooting pot outlets in the second position.

5. The molding system of claim 2, wherein the member comprises a shape selected from the group consisting of a circular rod, a non-circular rod, a block, a plate, and a non-linear shape, wherein the shape is symmetric or non-symmetric.

6. The molding system of claim 2, wherein the first portions and second portions each comprise at least one of a through hole, a reduced cross-sectional area, and a cutout.

7. The molding system of claim 2, wherein at least one of the first portions and the second portions comprise a distal end of the member.

8. The molding system of claim 1, wherein the valve is constructed and arranged to isolate the shooting pots from the refill circuit in the first position.

9. The molding system of claim 1, wherein the valve is constructed and arranged to isolate the shooting pots from the injection circuit in the second position.

10. The molding system of claim 1, wherein the valve is constructed and arranged to move between the first and second positions by at least one of a rotational motion and a linear motion.

11. A method of selectively allowing material to flow into and out from a plurality of shooting pots of an injection molding system, the plurality of shooting pots having inlets and outlets, a valve is adapted to control flow through both the inlets and the outlets of the plurality of shooting pots, the method comprising:
positioning the valve in a first position to block flow through the inlets of the plurality of shooting pots and permit flow through the outlets of the plurality of shooting pots; and
positioning the valve in a second position to permit flow through the inlets of the plurality of shooting pots and block flow through the outlets of the plurality of shooting pots.

12. The method of claim 11, further comprising positioning a member of the valve in the first position, wherein first portions of the member block flow through the inlets of the plurality of shooting pots and second portions of the member permit flow through the outlets of the plurality of shooting pots when the member is positioned in the first position.

13. The method of claim 11, further comprising positioning the member of the valve in the second position, wherein first portions of the member permit flow through the inlets of the plurality of shooting pots and second portions of the member block flow through the outlet when the member is positioned in the second position.

14. The method of claim 11, wherein positioning the valve between the first and second positions comprises moving the valve through at least one of a rotational motion and a linear motion.

15. The method of claim 11, further comprising injecting a material into a mold when the valve is in the first position.

16. The method of claim 15, further comprising actuating the plurality of shooting pots when the valve is in the first position to inject the material into the mold.

17. The method of claim 11, further comprising refilling the plurality of shooting pots with a material when the valve is in the second position.

18. The method of claim 17, further comprising retracting a plunger of the plurality of shooting pots when the valve is in the second position.

19. An injection molding system, comprising:
a hot runner;
a shooting pot operatively coupled with the hot runner having a shooting pot inlet connected to a refill circuit and a shooting pot outlet connected to an injection circuit;
a valve gated nozzle fluidly coupled with the injection circuit and comprising a valve stem, wherein the valve stem is movable between a first and second position, wherein the valve stem permits flow from the shooting pot outlet through the valve gated nozzle in the first position and blocks flow from the shooting pot outlet through the valve gated nozzle in the second position, wherein the valve stem includes a portion adapted to block flow through the shooting pot inlet in the first position, and permit flow through the shooting pot inlet in the second position.

20. The molding system of claim 19, wherein the valve stem portion comprises at least one of a through hole, a reduced cross-sectional area, and a cutout.

21. The molding system of claim 19, wherein the valve stem is moved between the first and second positions by at least one of a rotational motion and a linear motion.

22. The molding system of claim 19, wherein the valve stem isolates the shooting pot from the refill circuit in the first position.

23. The molding system of claim 19, wherein the valve stem isolates the shooting pot from the injection circuit in the second position.

* * * * *